United States Patent
Eimers-Klose et al.

(10) Patent No.: US 7,802,016 B2
(45) Date of Patent: Sep. 21, 2010

(54) GATEWAY UNIT FOR CONNECTING SUB-NETWORKS, IN PARTICULAR IN VEHICLES

(75) Inventors: Doerte Eimers-Klose, Stuttgart (DE); Cornelia Heinisch, Wannweil (DE); Joerg Fischer, Murr (DE); Timo Gramann, Lauchringen (DE)

(73) Assignee: Robert Bosch GmbH, Stuttgart (DE)

( * ) Notice: Subject to any disclaimer, the term of this patent is extended or adjusted under 35 U.S.C. 154(b) by 355 days.

(21) Appl. No.: 10/535,486

(22) PCT Filed: Nov. 20, 2003

(86) PCT No.: PCT/DE03/03848

§ 371 (c)(1),
(2), (4) Date: Oct. 21, 2005

(87) PCT Pub. No.: WO2004/047385

PCT Pub. Date: Jun. 3, 2004

(65) Prior Publication Data

US 2006/0130049 A1    Jun. 15, 2006

(30) Foreign Application Priority Data

Nov. 20, 2002    (DE) ................ 102 54 285

(51) Int. Cl.
*G06F 15/16* (2006.01)
*G06F 15/173* (2006.01)
(52) U.S. Cl. .................. 709/249; 709/238
(58) Field of Classification Search ............ 709/238, 709/249
See application file for complete search history.

(56) References Cited

U.S. PATENT DOCUMENTS

| | | | | |
|---|---|---|---|---|
| 5,630,101 A * | 5/1997 | Sieffert | ............... | 710/11 |
| 5,754,548 A * | 5/1998 | Hoekstra et al. | ............... | 370/402 |
| 6,212,546 B1 * | 4/2001 | Starkovich et al. | ............. | 709/203 |
| 6,832,142 B2 * | 12/2004 | Busse | ............... | 701/36 |
| 7,152,094 B1 * | 12/2006 | Jannu et al. | ............... | 709/206 |
| 7,254,645 B2 * | 8/2007 | Nishi | ............... | 709/249 |
| 7,366,769 B2 * | 4/2008 | Kaan et al. | ............... | 709/218 |
| 7,559,066 B2 * | 7/2009 | Ho et al. | ............... | 719/330 |
| 2002/0065935 A1* | 5/2002 | Koperda et al. | ............ | 709/238 |
| 2002/0141438 A1 | 10/2002 | Justice et al. | | |
| 2006/0023676 A1* | 2/2006 | Whitmore et al. | ............ | 370/338 |
| 2006/0203804 A1* | 9/2006 | Whitmore et al. | ............ | 370/352 |
| 2009/0300578 A1* | 12/2009 | Neil | ............... | 717/104 |

FOREIGN PATENT DOCUMENTS

| | | |
|---|---|---|
| DE | 100 44 818 | 4/2002 |
| EP | 1 361 713 | 11/2003 |
| WO | WO 01/26337 A2 * | 4/2001 |

OTHER PUBLICATIONS

Amirfaiz, F.E., "Design and Implementation of a Generic Gateway," Proceedings of the Computer Networking Symposium, Washington, Nov. 17-18, 1986, IEEE Comp. Soc. Press, US, Nov. 1986, pp. 205-213.

* cited by examiner

*Primary Examiner*—Douglas B Blair
(74) *Attorney, Agent, or Firm*—Kenyon & Kenyon LLP

(57) ABSTRACT

A gateway unit for connecting subsystems, in vehicles in particular, in which at least one modular logical software gateway is used which routes messages between precisely two subnets, thus providing only one individual connection pathway.

13 Claims, 4 Drawing Sheets

GATEWAY UNIT FOR CONNECTING SUB-NETWORKS, IN PARTICULAR IN VEHICLES

FIELD OF THE INVENTION

The present invention relates to a gateway unit for connecting subnets, in vehicles in particular.

BACKGROUND INFORMATION

To make new services in the vehicle possible, communication among the control units located in different bus segments is indispensable. Such communication may take place only if the different bus segments are connected to one another via one or more gateway units. A gateway unit connecting two bus segments has the function of relaying messages received on one bus segment to another bus segment (routing). The complexity of such a gateway unit increases with the number of bus segments to be connected. When designing the network connection architecture of a vehicle, an attempt is made to find an optimum for the characteristics of tolerable delay for message routing, error tolerance, flexibility, expansibility, and cost. Depending on the application, central gateway units having a star architecture or a plurality of gateway units which may be connected by a backbone bus, for example, are used. The gateway units via which different buses are connected are configured (for example, via tables). As a result, pure message routing to another segment does not require a change in the software. However, if the type and number of connected bus segments change, major changes are needed, in which not only the existing configuration tables must be adapted, but the entire software must be rewritten to meet the new requirements. The complexity of the central configuration and the routing software thus increases significantly with the number of connected bus segments.

SUMMARY

A modular design of a gateway unit is provided, in which a gateway incorporated in the software (logical software gateway) is responsible for routing messages between exactly two subnets makes it possible to expand gateways without need for changing the existing gateway software and/or the existing configuration tables. Adding or omitting such a modular gateway when changing the network topology avoids such changes. Similarly, it is also possible to remove a bus segment in the case of a central gateway unit without affecting existing connection pathways.

Furthermore, the above-mentioned modular gateways allow error limitation, because if a gateway is not operational, the other gateways continue to perform their functions independently of the defective gateway. An error is thus limited to the directly affected gateway; the connection to other bus segments remains unaffected. If an error occurs on a bus segment, messages continue to be routed without limitation via the other bus segments.

Furthermore, the above-outlined design is extensible in a flexible manner and adapted to the network connection architecture. If an additional subnet is added to a central gateway, only the additional modular gateways must be added. The existing modular gateways are not affected. If a subnet is removed, the gateways connected to this subnet are removed; the other gateways remain unchanged.

Since a logical gateway always only contains the function required for connecting the two different subnets, a message is routed in the quickest possible way. Unnecessary overhead for routing a message is thus avoided. Because a logical gateway is responsible for connecting two subnets, the information flow may be monitored separately if the data transfer takes place between a subnet having safety-critical functions and a subnet having functions which are not safety-critical. This provides the possibility of optimum monitoring for firewall functionality, which may monitor each connection pathway individually. A logical gateway which routes messages over an air interface may thus implement stricter security mechanisms against external threats than a logical software gateway which routes messages between two CAN subnets in the vehicle and is not directly exposed to external threats.

Furthermore, the above-described architecture permits one or more gateways to be individually activated and/or inactivated, so that one or more gateways may thus be switched on or off as a function of system states.

Furthermore, the complexity of the entire gateway unit is reduced, because the individual logical gateways are not connected to one another. It does not matter whether, for example, three logical gateways run on one central gateway or on three separate point-to-point gateways.

Additional advantages result from an example embodiment of the logical gateways, according to which routing tables are provided in each gateway via which the messages are routed and which are independent of the gateway software. This table-based approach permits the use of a tool for configuring the gateway software. This approach also advantageously provides a possibility to prioritize messages, so that certain messages which are to be routed preferentially are assigned a higher priority than other messages.

Furthermore, a scheduler is advantageously provided, which ensures, despite the division into several modular software gateways, that the order of message routing is observed. In this way, a message arriving first at the gateway also leaves the gateway first.

Further advantages may be derived from the following description of exemplary embodiments.

BRIEF DESCRIPTION OF THE DRAWINGS

The present invention is explained below in detail with reference to exemplary embodiments illustrated in the figures.

DESCRIPTION OF EXAMPLE EMBODIMENTS

Figure 1:
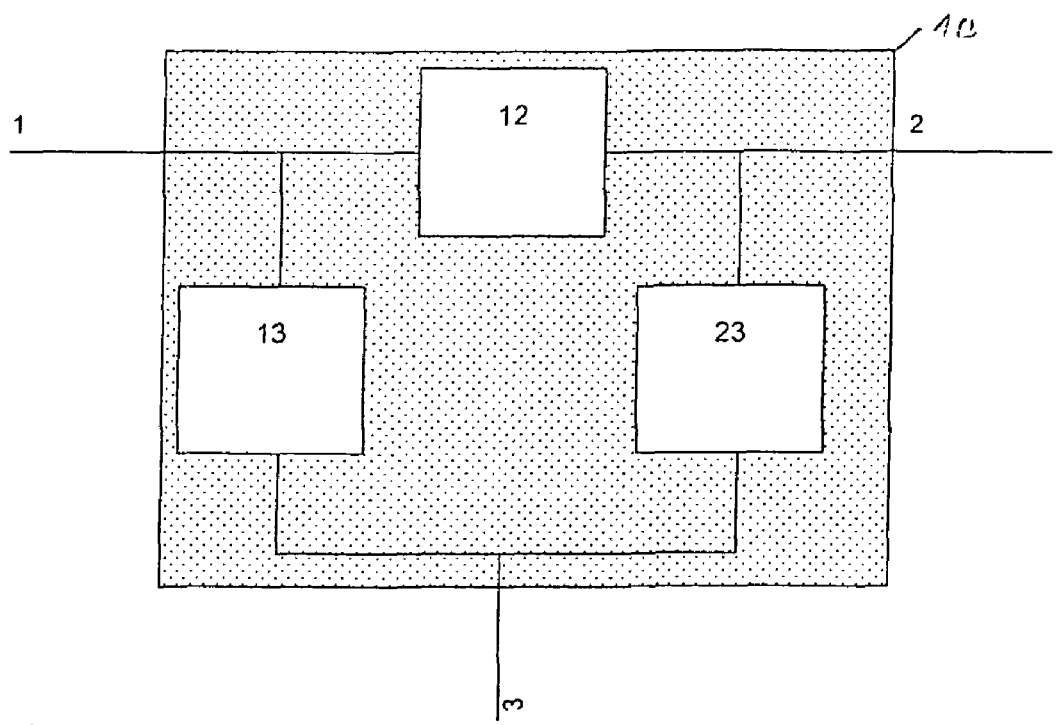
FIG. 1 shows the basic principle of the above-described architecture of a gateway unit connecting three bus segments.

FIG. 1 shows a gateway unit 10, which is connected to three bus segments 1, 2, 3 and has the function of routing messages from one bus segment to one or both of the other bus segments. The basic principle of the architecture shown are modular gateways (logical software gateways) 12, 13, 23, such a gateway being responsible for routing messages between exactly two subnets. Gateway 12 thus routes messages from 1 to 2 and vice-versa; gateway 13 routes messages from 1 to 3 and vice-versa, and gateway 23 routes messages from 2 to 3 and vice-versa. Each logical software gateway thus describes an individual connection pathway between two subnets, i.e., bus segments. Gateways 12, 13, 23 are designed as software programs, which are used to perform the protocol-specific adaptations needed for message routing between the two subnets. Depending on the exemplary embodiment, each subnet is an individual transmission medium. For example, subnet 1 may be a low-speed CAN; subnet 2 may be a high-speed CAN, and subnet 3 may be an SPI bus. If a new subnet is added, for example, a MOST bus, additional logical software gateways are introduced. The existing ones do not need to be modified. If a subnet, for example, the SPI bus, is removed, logical software gateways 13 and 23 are removed. Logical software gateways for all possible connections are to be written to have a universal gateway function. Depending on the design of the gateway to be implemented, these logical software gateways are then combined to form one overall system. In general, not all subnets are directly connected to one another, so that only selected connection pathways are to be provided with selected logical software gateways. If each subnet is to be connected to each other subnet, $N*(N-1)/2$ logical software gateways are needed. Variable N is the number of subnets in the overall system. Thus, for three subnets, there will be three logical software gateways; for four subnets there will be six, and for five subnets there will be ten logical software gateways. It is of secondary importance whether these logical software gateways are located in one central gateway or in a plurality of point-to-point gateways.

Figure 2:
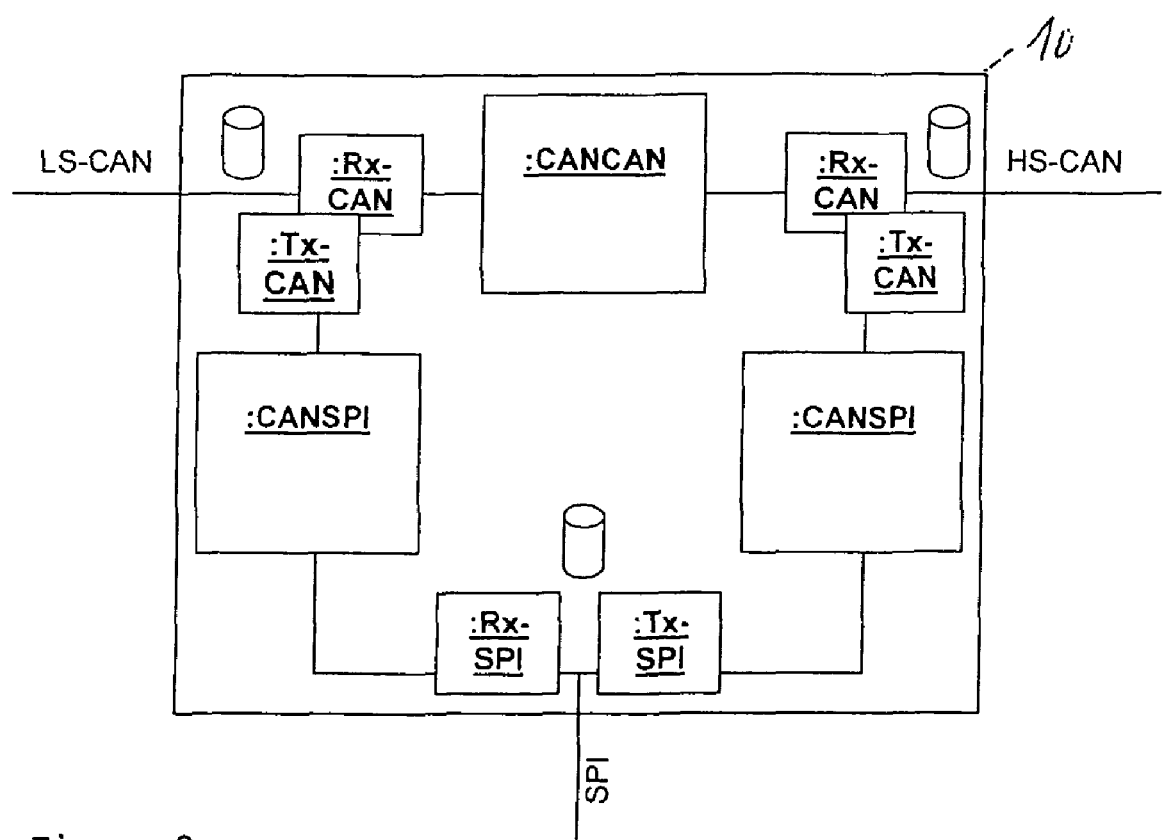
FIG. 2 shows a preferred exemplary embodiment of such a gateway transmitting messages between a low-speed CAN, a high-speed CAN, and an SPI bus.

FIG. 2 shows a detailed exemplary embodiment of features of the modular gateway architecture according to FIG. 1. Gateway 10, which is preferably implemented as a program in a microcontroller of a control unit, includes, in addition to the modular software gateways shown (:CANCAN, :CANSPI), bus-specific transmitting units, which monitor access to the bus medium. Receiving objects (:Rx-CAN, :Rx-SPI), which determine into which logical software gateway an incoming message is routed, are associated with each bus segment. Similarly, there are bus-specific transmitting objects (:Tx-CAN, :TxSPI) for the transmission operation, which monitor access to the particular bus and prevent more than one modular software gateway from simultaneously occupying the transmitting medium.

The software gateways (in FIG. 2: CANCAN:CANSPI) are internally composed of a plurality of software objects, which buffer incoming messages and perform the protocol-specific adaptations. One simple adaptation is, for example, that a CAN message is to be sent from high-speed CAN having ID 100 to low-speed CAN having ID 200. These protocol-specific adaptations are then performed by appropriate programs (for example, in the simplest case, by a table). Configuration tables are used for the protocol-specific adaptations performed within the logical software gateways.

In a preferred embodiment, the bus-specific receiving objects are configured via routing tables via which the decision is made as to whether an incoming message is to be routed to no logical software gateway, one logical software gateway, or both logical software gateways. The subsequent treatment of the message is thus saved in the routing table for each incoming message type. Furthermore, it may happen, due to the different speeds of the buses, that only every $5^{th}$ message of a certain type (for example, engine speed) is relayed from one bus segment to the other. This may also be implemented via the above-mentioned routing tables in the receiving object. These routing tables are independent of the source code of the actual gateway, so that a change in the routing table results in little or no change in the software of the respective modular gateway. The bus-specific receiving unit looks up the found message in the routing table and decides, on the basis of the information contained therein, which logical software gateway contains the message for further processing.

The bus-specific transmitting units, i.e., the programs provided there, monitor access to the bus. If the bus has just been occupied, they make sure that no message is sent by any logical software gateway.

In addition, as mentioned before, the logical software gateways buffer the messages to prevent loss of messages, for example, when the bus segment to which a message is to be sent has just been occupied. A message is thus kept in a wait loop before it is directly forwarded. The internal scheduler of the gateway unit takes notice of the message having been placed into a wait loop. It causes the message to be transmitted by transmitting a message to the corresponding modular logical software gateway, which then causes the message to be transmitted. Therefore, if a logical software gateway intends to transmit a message, it must report this intent to the scheduler. It depends on the order of the reports which software gateway first obtains the authorization for sending a message. This ensures that the correct order of the messages is observed. If the system contains particularly high-priority messages, the scheduler provides a plurality of methods for reporting an intent to transmit; these methods may be called by the logical software gateways. The scheduler always processes the high-priority requests first and then those of normal priority, and it grants transmission authorizations to the logical software gateways as a function of the priorities. For example, each intent to transmit is provided with a piece of information representing the priority of the message, or the scheduler includes a table in which the priorities of the messages are marked; the scheduler reads the priority from the table.

The above-described architecture and procedure permit the gate unit to be configured via tables without modifying their software. For example, by modifying the parameter sets in the memory, the gateway may be reprogrammed for different message routing. If the same interfaces are used, the gateway software may be configured exclusively using parameter sets. If other interfaces are connected to the gateway, a modular software module is to be integrated into the gateway. Different gateway configurations are thus generated by combining software modules, for example, from libraries and by providing routing information. Integration of a new CAN interface having a new CAN matrix is basically limited to the inputting of the new routing information into the routing table. CAN-CAN gateways of different baud rates may thus be integrated into a system in a very short time. Testability and verification of the obtained codes are simplified by the fact that the configuration-dependent code is centrally tested and only an integration test for the new logical SW gateway, i.e., the new configuration, is performed in addition to the system test.

Figure 3:
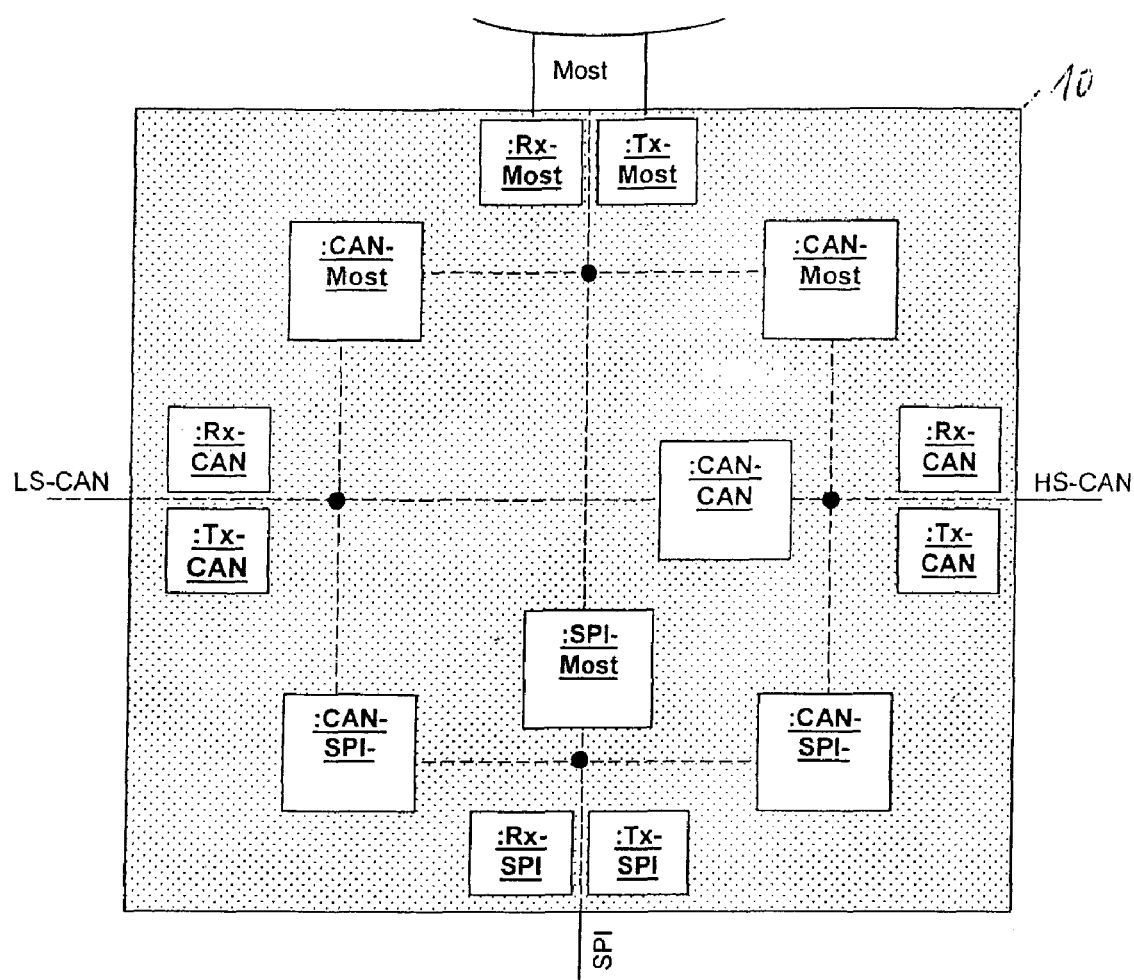
FIG. 3 shows a central gateway unit for connecting four subnets.
Figure 4:
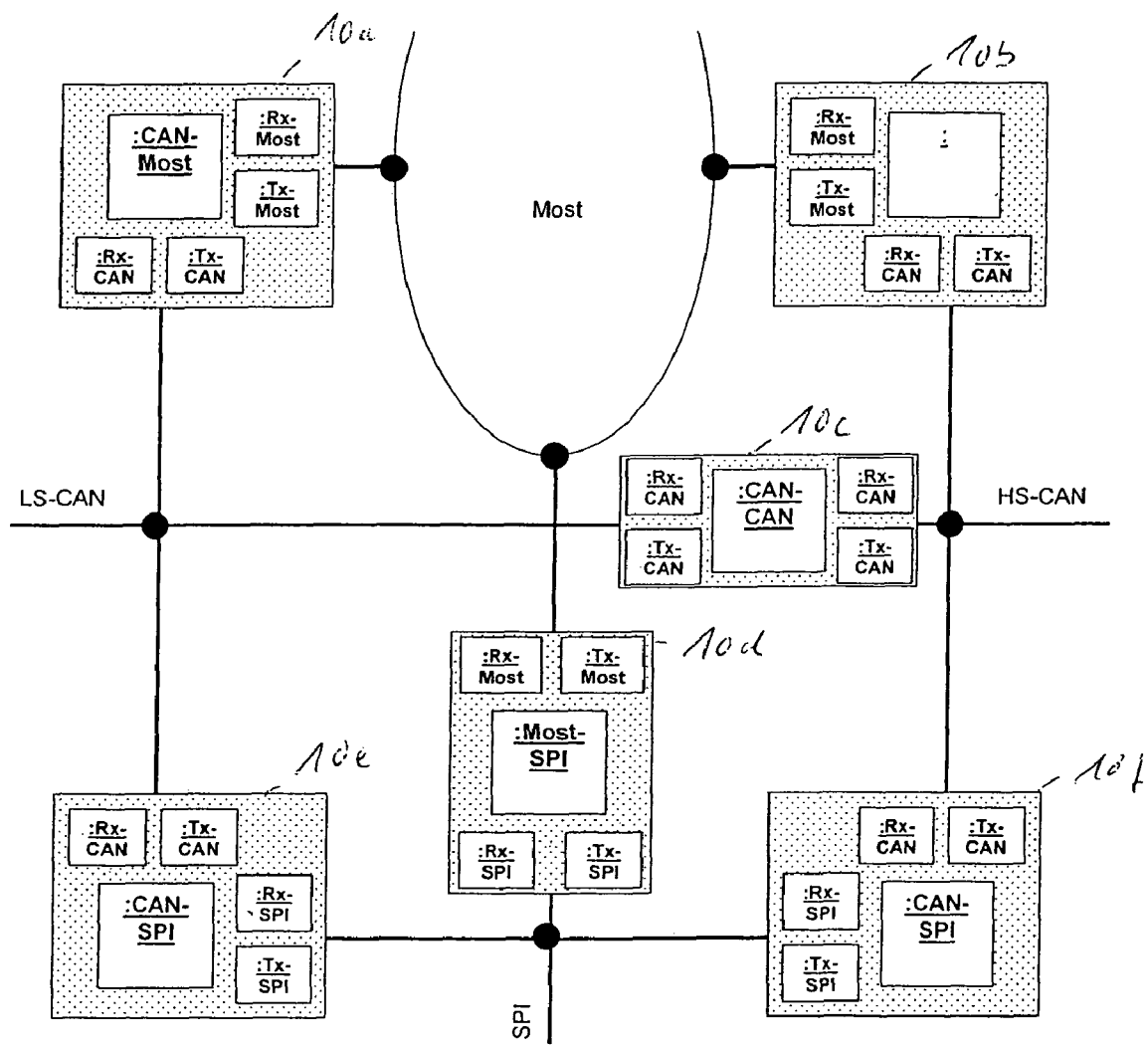
FIG. 4 shows point-to-point gateway units for connecting the four subnets using the above-described gateway architecture.

FIG. 3 shows a gateway 10 for connecting four different bus segments: a low-speed CAN, a high-speed CAN, an SPI bus, and a MOST bus. The above-described architecture is also used here, logical software gateways (:CAN-MOST, :CAN-SPI, :CAN-CAN, :SPI-MOST), each implementing an individual connection pathway, being used. In addition, bus-specific receiving modules (:Rx-Most, :Rx-CAN, :Rx-SPI) and transmitting modules (:Tx-Most, :Tx-CAN, :Tx-SPI) are illustrated as described above. The depicted architecture shows a central gateway unit connecting the above-mentioned four bus segments. FIG. 4 shows another network topology, which has six point-to-point gateway units 10a, 10b, 10c, 10d, 10e, and 10f. Each of these point-to-point gateways contains the above-described logical software gateway structure having transmitting and receiving elements for bus-specific connection. It is evident that, due to the above-described architecture, the physical network connection architecture may contain all conceivable mixed forms between the two extremes of a central gateway and a point-to-point gateway. The software architecture is independent of the physical network connection architecture, so that it allows for connection in all conceivable architectures. The difference may be that, for the central gateway variant, the software runs on one microcontroller, while in the decentralized variant it runs on different controllers.

Different options exist for configuring the gateway unit. The routing decision is configured via routing tables. In this case, the bus-specific receiving objects determine into which logical software gateways a message is to be relayed. These receiving objects are therefore configured using routing tables, which specify which messages are to be relayed into which subnet and optionally under what conditions (for example, every $5^{th}$, etc.). The software of the software gateways then implements the bus-specific adaptations and is independent of the actual routing procedure. The software gateways are then configured via adaptation of protocol parameters. In this case, the logical gateways are configured via tables, which specify how the protocol parameters are to be implemented. The configuration may include here that a message having ID code 100 must have ID number 200 when transmitted to the other network segment. Furthermore, the routing tables via which the bus-specific receiving objects are configured are to be divided or combined to adapt the gateway software to the different network connection architectures. This function is performed by an internal scheduler, which coordinates the logical software gateways in a central gateway unit. The scheduler must be generated individually for the different gateway variants.

Figure 5:
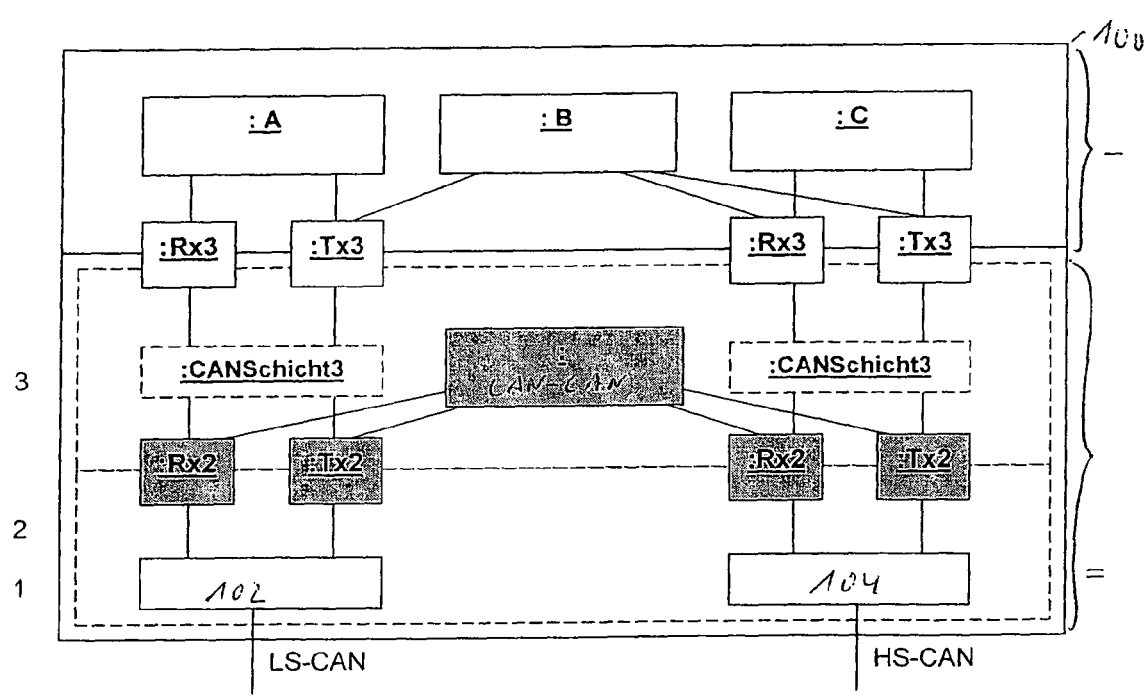
FIG. 5 shows a gateway integrated in a control unit using a layer model.

In another embodiment, which is depicted in FIG. 5, the gateway is not a standalone gateway, but a gateway which is integrated into a control unit having additional application functions. In this case the gateway software may also assume the functionality of a normal communication deck. This means that it should also be possible here to relay messages to the actual applications and to receive messages from these applications for transmission. For this purpose, additional objects having the capability of removing or adding layer-specific protocol parameters are needed to relay the message to the next higher or next lower level. These additional objects are normally part of the software of the normal communication network. FIG. 5 shows the layer model of a control unit 100, in which a CAN-CAN gateway is integrated. A distinction is made between application system I and communication system II. Three layers 1, 2, 3 are illustrated, a driver 102 being provided for the low-speed CAN and a driver 104 being provided for the high-speed CAN in a first layer. Furthermore, additional objects are introduced into network layer 3 (CAN layer 3) which communicate with applications A, B, and C via receiving and transmitting objects Rx3 and Tx3. These additional objects buffer the messages if needed and add or remove protocol-specific parameters. The logical software gateway which is integrated into this layer (CAN-CAN) routes messages from one bus to another. Receiving and transmitting objects Rx2 and Tx2 are used as described above for routing messages between the two CAN buses. They represent the interfaces between the layers. In another embodiment, an appropriate extension makes it possible to link two subnets on different layers. This is required, for example, when a transport protocol (for example, ISO TP) is used. In this case, there is one logical software gateway per layer in which connection takes place. Thus, for example, one CAN-CAN gateway may be provided in layer 3, which transports CAN messages (e.g., speed information or fuel tank level information) in layer 3, while another CAN-CAN gateway injects transport information, for example, a text for display in the vehicle computer, in a layer 4. Connection in higher layers may also be necessary to check the contents of a message to be relayed. The contents may be analyzed only when the complete message has been received.

What is claimed is:

1. A computer implemented device for connecting subnets in a vehicle, comprising:
    a gateway unit configured to connect at least two subsystems, wherein the gateway unit is made of at least one modular software gateway, which routes messages between only two subnets in the vehicle; and
    hardware implemented bus-specific receiving objects configured to one of (1) relay incoming messages to selected software gateways, and (2) monitor access to a particular bus, for each subnet, wherein the bus-specific receiving objects are provided for each subnet, the messages are kept in a wait loop before being relayed, and each receiving object is individual for each subnet.

2. The device as recited in claim 1, wherein at least three subnets are connected to the gateway unit, the gateway unit including a plurality of modular software gateways, each of the modular software gateways routing messages between only two subsystems.

3. The device as recited in claim 1, wherein the receiving objects include routing tables in which a treatment of incoming messages is configured.

4. The device as recited in claim 3, wherein the at least one modular software gateway expands gateways without changing the at least one modular software and the routing tables.

5. The device as recited in claim 1, wherein the modular software gateway is configured to buffer incoming messages and perform protocol-specific adaptations.

6. The device as recited in claim 1, wherein the hardware implemented bus-specific receiving objects are configured to relay incoming messages to selected software gateways, the hardware implemented bus-specific receiving objects being provided for each subnet,
    wherein at least three subnets are connected to the gateway unit, the gateway unit including a plurality of modular software gateways, each of the modular software gateways routing messages between only two subsystems,
    wherein the receiving objects include routing tables in which a treatment of incoming messages is configured, and
    wherein the modular software gateway is configured to buffer incoming messages and perform protocol-specific adaptations.

7. The device as recited in claim 1, wherein the hardware implemented bus-specific receiving objects are configured to monitor access to a particular bus, for each subnet,
    wherein at least three subnets are connected to the gateway unit, the gateway unit including a plurality of modular software gateways, each of the modular software gateways routing messages between only two subsystems,
    wherein the receiving objects include routing tables in which a treatment of incoming messages is configured, and
    wherein the modular software gateway is configured to buffer incoming messages and perform protocol-specific adaptations.

8. A computer implemented device for connecting subnets in a vehicle, comprising:

a gateway unit configured to connect at least two subsystems, the gateway unit being integrated in a control unit having an application system and being provided in one layer of a communication system of the vehicle, the gateway unit including at least one modular logical gateway and hardware implemented bus-specific receiving objects configured to one of (1) relay incoming messages to selected software gateways, and (2) monitor access to a particular bus, for each subnet, wherein the hardware implemented bus-specific receiving objects are provided for each subnet, the logical gateway connect only the at least two subsystems in the vehicle;

the subsystems are subnets;

wherein the messages are kept in a wait loop before being relayed, and each receiving object is individual for each subnet.

9. The device as recited in claim 8, wherein at least three subnets are connected to the gateway unit, the gateway unit including a plurality of modular software gateways, each of the modular software gateways routing messages between only two subsystems.

10. The device as recited in claim 8, wherein the receiving objects include routing tables in which a treatment of incoming messages is configured.

11. The device as recited in claim 8, wherein the modular software gateway is configured to buffer incoming messages and perform protocol-specific adaptations.

12. The device as recited in claim 8, wherein the hardware implemented bus-specific receiving objects are configured to relay incoming messages to selected software gateways, the hardware implemented bus-specific receiving objects being provided for each subnet, wherein at least three subnets are connected to the gateway unit, the gateway unit including a plurality of modular software gateways, each of the modular software gateways routing messages between only two subsystems.

wherein the receiving objects include routing tables in which a treatment of incoming messages is configured, and wherein the modular software gateway is configured to buffer incoming messages and perform protocol-specific adaptations.

13. The device as recited in claim 8, wherein the hardware implemented bus-specific receiving objects are configured to monitor access to a particular bus, for each subnet, wherein at least three subnets are connected to the gateway unit, the gateway unit including a plurality of modular software gateways, each of the modular software gateways routing messages between only two subsystems, wherein the receiving objects include routing tables in which a treatment of incoming messages is configured, and wherein the modular software gateway is configured to buffer incoming messages and perform protocol-specific adaptations.

* * * * *